United States Patent [19]

Yamada et al.

[11] Patent Number: 5,449,589
[45] Date of Patent: Sep. 12, 1995

[54] METHOD OF MAKING AN OPTICAL INFORMATION RECORDING MEDIUM AND METHOD OF RECORDING/REPRODUCING OPTICAL INFORMATION

[75] Inventors: Noboru Yamada, Hirakata; Ken'ichi Nagata, Neyagawa; Kenichi Nishiuchi, Moriguchi, all of Japan

[73] Assignee: Matsushita Electric Industrial Co., Ltd., Osaka, Japan

[21] Appl. No.: 115,645

[22] Filed: Sep. 3, 1993

Related U.S. Application Data

[60] Division of Ser. No. 997,640, Dec. 28, 1992, Pat. No. 5,273,861, which is a continuation of Ser. No. 663,798, Mar. 4, 1991, abandoned, which is a continuation of Ser. No. 276,630, Nov. 28, 1988, abandoned.

[30] Foreign Application Priority Data

Dec. 4, 1987 [JP] Japan .................. 62-307867

[51] Int. Cl.$^6$ .................. G03C 1/72; G11B 7/24
[52] U.S. Cl. .................. 430/271; 430/272; 430/273; 430/275; 430/290; 430/346; 430/945; 427/162
[58] Field of Search .......... 430/19, 271–273, 430/275, 290, 346, 495, 945; 346/135.1; 428/64, 65; 427/9, 162

[56] References Cited

U.S. PATENT DOCUMENTS

| | | | |
|---|---|---|---|
| 4,633,273 | 12/1986 | Watanabe et al. | 346/135.1 |
| 4,670,345 | 6/1987 | Morimoto et al. | 430/945 |
| 4,710,899 | 12/1987 | Young et al. | 430/945 |
| 4,743,526 | 5/1988 | Ando et al. | 430/270 |
| 4,847,132 | 7/1989 | Takao et al. | 428/64 |
| 4,879,205 | 11/1989 | Suzuki | 430/523 |

FOREIGN PATENT DOCUMENTS

| | | | |
|---|---|---|---|
| 0217293 | 4/1987 | European Pat. Off. | |
| 0193452 | 11/1984 | Japan | 430/270 |
| 0257291 | 12/1985 | Japan | 430/945 |
| 2246788 | 10/1987 | Japan | |
| 2148148 | 5/1985 | United Kingdom | |

OTHER PUBLICATIONS

High Speed Overwritable Phase Change Optical Disk Material, Noboru Yamada et al., Japanese Journal of Applied Physics, vol. 26 (1987), Supplement 26-4, pp. 61-66.

Optical Properties of Thin Solid Films, O. S. Heavens, Dover Publication, 1965, pp. 69-75.

CRC Handbook of Chemistry and Physics, 63rd Edition pp. E202, E203.

Primary Examiner—Lee C. Wright
Attorney, Agent, or Firm—Stevens, Davis, Miller & Mosher

[57] ABSTRACT

A rewritable optical information recording medium of phase-change type wherein the recording, erasing, reproduction and rewriting of information are effected by irradiation of a high density energy flux such as laser beams. With the aim of obtaining a high erasing ratio in overwriting using a single laser beam, a constitution of medium has been devised whereby the same temperature-rise profile can be obtained for both the recorded mark part and the unrecorded (erased) part of the recording film. For example, by selecting the film thickness of each layer such that the optical absorbance at the wavelength of irradiation light source is the same in both the recorded part and the unrecorded part, an erasing ratio of −30 dB or more has been attained.

6 Claims, 1 Drawing Sheet

METHOD OF MAKING AN OPTICAL INFORMATION RECORDING MEDIUM AND METHOD OF RECORDING/REPRODUCING OPTICAL INFORMATION

This is a division of application Ser. No. 07/997,640, filed Dec. 28, 1992, now U.S. Pat. No. 5,273,861, which is a continuation of Ser. No. 07/663,798, filed Mar. 4, 1991 (abandoned), which is a continuation of Ser. No. 07/276,630, filed Nov. 28, 1988 (abandoned).

BACKGROUND OF THE INVENTION

The present invention relates to a rewritable optical information recording medium of phase-change type wherein the recording, erasing, reproduction, and rewriting of information are effected by irradiation of a high-density energy flux such as laser beams.

The technique is already known which comprises forming a thin, light-absorbing recording film on a substrate of glass, resin or similar materials having a smooth surface, and then irradiating thereonto a laser beam converged into a micro spot to cause a local change of optical properties at the irradiated part, and thereby recording intended information. In such a technique, by using, as the recording film, for example, a thin film of certain kinds of chalcogenide glass based on Te, Se and the like or a thin film of metals such as AgZn and AuSb, it is possible to make the above-mentioned change of optical properties reversible and thereby to perform the recording, erasing and rewriting of information repeatedly. The recording and erasing are effected based on the difference in optical properties due to the reversible change of structure on an atomic level between the crystal phase and the amorphous phase, or between the high temperature phase and the low temperature phase of the crystal phase, of respective recording film. Thus, according to one type of operation, record/erase operations are reversible based on changes between crystal and amorphous phases. In another type of operation, record/erase operations are reversible based on changes between high and low temperature phases of the crystal phase. In either type, the difference in the quantity of reflected light, or the quantity of transmitted light, of a specific wavelength is detected as a signal. In other words, the light absorbed in the recording medium is converted into heat to increase the temperature of the irradiated part. In recording, the irradiated part is brought to an elevated temperature until it fuses and then is quenched from the fused state, whereby a recorded state in the term of and amorphous state or a high temperature phase of the crystal phase is obtained. In erasing, these metastable phases are heated and maintained in the vicinity of the glass transition temperature, whereby an erased state in the form of a crystal state or low temperature phase of the crystal phase is obtained. Between the recorded state and the erased state, there exist differences in optical constants (e.g. refractive index and extinction coefficient), which can be detected as differences in such optical properties as reflectance and transmittance. In general practice, the recording film layer is used in a sandwiched structure with layers of dielectrics such as $SiO_2$ and ZnS to avoid vaporization and so forth of the recording film layer in repeated use. In the prior art, the thickness of each layer was selected so as to give an enhanced recording sensitivity, for example, to increase the absolute efficiency of light absorption of the recording layer in respective states and to give, at the same time, as wide a difference as possible in the quantity of reflected light or transmitted light before and after the change. In one example, a light-reflecting layer of Au, Al and the like was additionally applied onto the dielectric layer of the side opposite to the incident light.

The recording and erasing by means of irradiation of a laser beam onto the recording medium may be conducted in practice according to either of the following two methods. In one method, separate laser beams are used respectively for recording and for erasing, and previously recorded signals are erased by the preceding beam and new signals are recorded by the succeeding beam (namely, so-called overwriting is conducted). In the other method, a single laser beam is used, whose irradiation power can be changed on two steps of recording level and erasing level and is modulated therebetween in response to information signals, and new signals are directly written on the information track having signals recorded thereon (namely, so-called direct overwriting is conducted). In the former method, the laser power and irradiation time can be selected independently for recording and for erasing and hence no particular problem due to overwriting occurs. On the other hand, the latter method, which has come to be predominantly used, has the advantage of facilitating the design of optical heads but, on the other hand, brings about the following disadvantage. That is, since no previous erasing operation is conducted before recording, recording marks having different sizes and atomic ordering are produced in the case of recording onto amorphous parts (that is, making the parts amorphous again) as comprised with the case of recording onto crystal parts. In other words, a problem occurs wherein the dimensions of recording marks change to some extent in accordance with the state before recording as a result the signal component which should have been erased before leaves some effect on new signals. The above problem is conceivably caused by the following two factors. One is the difference in optical absorbance of the recording layer existing between the amorphous state part and the crystal state part. The other is the difference in the energy required for melting (latent heat of melting) of the recording layer existing between the amorphous state part and the crystal state part.

SUMMARY OF THE INVENTION

An object of the present invention is to provide, as a means for solving the above problem, an optical information recording medium wherein the respective film thicknesses of the recording layer, dielectric layer and reflecting layer are so designed as to make the optical absorbance of the recording layer in the recorded state and that in the erased state equal to each other.

Another object of the present invention is to provide an optical information recording medium wherein, in order that the difference in latent heat of melting (or like properties) between the recording film in the recorded state and that in the erased state might be cancelled out, the state whose latent heat of melting is higher is made to have a higher light absorption efficiency than that of the state whose latent heat of melting is lower. Thus, by making the optical absorbance of the recording layer in the two states equal to each other or by making them differ from each other enough to counterbalance the difference in latent heat of melting, approximately similar temperature-rise profiles can be obtained for both states and hence the shapes and dimensions of recording marks can be made substantially equal. Thus, overwriting is possible at a high erasing ratio.

It should be noted that as used herein the term "optical absorbance" means the ratio of the absorbed light quantity to the irradiated light quantity of a material.

DETAILED DESCRIPTION OF THE INVENTION

Figure 1:
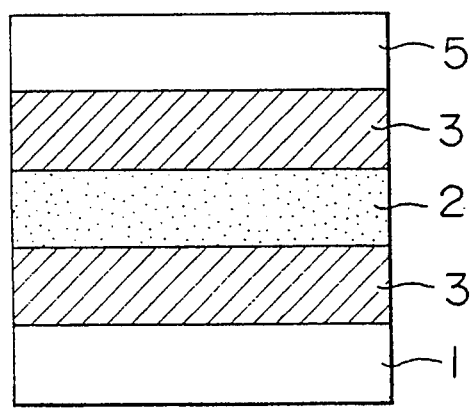
FIGS. 1 and 2 each show a sectional view of an embodiment of the optical information recording medium according to the present invention.
Figure 2:
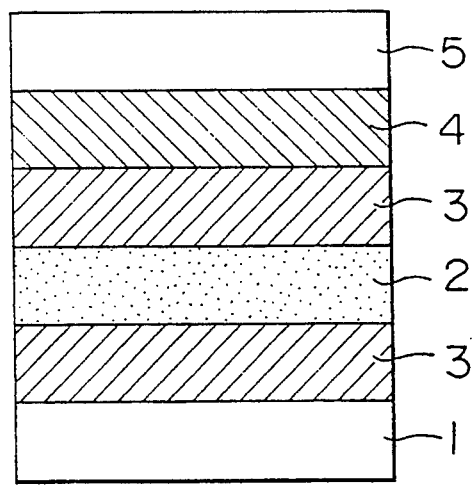

The optical information recording medium of the present invention is, as shown in FIGS. 1 and 2, constructed by forming a recording layer 2, sandwiched between dielectrics 3 such as $SiO_2$ and ZnS, on a substrate 1 having a smooth surface made of resins such as polymethyl methacrylate (PMMA) and polycarbonate, metals such as Al and Cu, or glass. The material used for constituting the recording layer may be those in which the reversible phase change between amorphous state and crystal state is made use of, typically chalcogenides based on Te and Se, for example, GeTe, InSe, InSeTl, InSeTlCo, GeTeSb, GeTeSn, GeTeSnAu, InTe, InSeTe, InSbTe, SbSeTe and the like, and those in which the reversible phase change between high-temperature crystalline phase and low-temperature crystalline phase, for example, InSb, AuZn, AuSb and the like is utilized. A construction is also possible wherein a light reflecting layer 4 is additionally provided on the dielectrics layer of the side opposite to the incident laser beam. For the reflecting layer there may be used Au, Cu, Al, Ni, Cr, Pt, Pd, and alloys thereof. It is also possible to laminate a protecting sheet or plate 5 onto the upper-most part by a vacuum deposition method or through an adhesive resin layer.

The essential point of the present invention is to make the temperature-rise profiles of the recording layer in the two states (recorded state and erased state) before and after recording substantially equal to each other, which can be achieved by appropriately selecting the film thickness of respective layers in the construction stated above. The film thickness of respective layers can be determined, based on the optical constant (refractive index or extinction coefficient), by a calculation using, for example, the matrix method described on page 69 of "OPTICAL PROPERTIES OF THIN SOLID FILMS" (written by O.S. Heavens, published by Dover Publication Inc. in 1965). The selection of items to be calculated is a step forward from that in the prior method; namely, not only the absolute values of optical absorbance of the recorded part and the unrecorded part but also the relative relationship between the two values is taken into consideration. In other words, conditions are preferentially adopted wherein the difference between the two values is small even if their absolute values are somewhat low or wherein, as will be described later, the absorbance of the more difficultly fusible state is higher.

Thus, it is important that (1) when no difference in internal energy exists between the two states of before and after recording (namely, recorded state and erased state) the optical absorbances of the recording layer in the two states should be made equal to each other and (2) when a difference in the easiness of fusion exists due to a difference of internal energy, the optical absorbance of the more difficultly fusible state should be made to be relatively higher, thereby to obtain in either state a similar temperature-rise profile in respect of both time and space. As compared with the amorphous state, the crystal state is low in internal energy (so that its latent heat of melting is lower) and hence requires correspondingly higher energy in melting. Similarly, when the high temperature phase in the crystal phase is compared with the low temperature phase, the latter phase has a lower latent heat of melting and requires a higher energy for melting. Thus, where E represents a quantity of energy required for melting; a represents an amorphous state and a higher temperature phase; b represents a crystal state and a lower temperature phase; and $E_a$ and $E_b$ represent a quantity of energy required for melting each of these substances in state a or b respectively, the relationship or correlation between $E_a$ and $E_b$ is as follows: $E_a < E_b$. Accordingly, when use is made of the phase change between the amorphous state and the crystal state or of the phase change between the high temperature phase in the crystal phase and the low temperature phase, the optical absorbance of the recording layer in the crystal phase or in the low temperature phase is respectively made relatively higher than that in the amorphous phase or high temperature phase, so that the recording layer in the respective former phases may absorb a greater amount of energy. Tables 1(a) and (b) show an embodiment of the present invention wherein the recording medium is shaped in the form of a so-called optical disk whose recording layer is formed of $GeSb_2Te_4$, the dielectrics layer of ZnS and the reflecting layer of Au. The substrate is polycarbonate and has spiral tracks formed thereon for the light guide. In this recording film, the latent heat of melting is about 6 cal/g higher for the crystalline phase than that of the amorphous phase and hence it is expected that said difference must be cancelled out by controlling the balance of optical absorbance of the recording layer for both states. It is shown in Tables 1(a) and 1(b) that the respective optical absorbance of the recorded part and the erased part becomes higher or lower relative to each other depending on the selection of the film thickness of respective layers. Evaluations were performed on a dynamic tester having a single laser diode of 830 nm in wave length for several combinations of these film thicknesses to examine comparatively the CN ratio and erasing ratio. Table 1(a) shows some examples of film thickness constitution and Table 1(b) shows the optical absorbance in the recording layer and reflectance of the disk before and after recording for 830 nm in wave length, as well as the CN ratio and erasing ratio for these examples.

Each constitution has the following characteristic. In the Tables, sample Nos. 1, 2 and 3 each have a recording layer of 40 nm thickness and sample Nos. 4, 5 and 6 a recording layer of 20 nm thickness. In each sample group, the relationship between the optical absorbance Aa of the recording layer at the amorphous part and the absorbance Ab at the crystal part was selected so as to be, in the order of the sample number, Aa<Ab, Aa=Ab and Aa>Ab. In the determination, recording signals were overwritten at a linear velocity of 15 m/sec and alternately at a frequency of 7 MHz or 5 MHz. The laser power level was 12–20 mW for recording (amorphizing) and 5–10 mW for erasing (crystallizing). The Tables show the best values of CN ratio (CNR) and erasing ratio in the above-mentioned range of power levels at 7 MHz. The Tables reveal that when the optical absorbance of the recording layer in the amorphous state is higher than that in the crystal state no satisfactory erasing ratio is obtained though the CNR is high, and when the optical absorbance of the recording layer in the crystal state is equal to or higher than that in the amorphous state a high CNR and a high erasing ratio can be obtained simultaneously.

Thus, according to the optical information recording medium of the present invention, it has become possible to conduct overwriting using a single laser beam while maintaining a high CNR and a high erasing ratio.

TABLE 1 (a)

Disk Constitution Examples

| Sample No. | Under coating layer ZnS | Recording layer GeSb$_2$Te$_4$ | Upper coating layer ZnS | Reflecting layer Au |
|---|---|---|---|---|
| 1 | 86 nm | 40 nm | 151 nm | 20 nm |
| 2 | 86 nm | 40 nm | 145 nm | 20 nm |
| 3 | 43 nm | 40 nm | 140 nm | 20 nm |
| 4 | 86 nm | 20 nm | 173 nm | 20 nm |
| 5 | 48 nm | 20 nm | 162 nm | 20 nm |
| 6 | 65 nm | 20 nm | 162 nm | 20 nm |

TABLE 1 (b)

Comparison of Characteristic of Each Disk

| Sample No. | | Amorphous | Crystal | CNR (dB) | Erasing ratio (dB) |
|---|---|---|---|---|---|
| 1 | Reflectance | 2.9% | 22.0% | 56 dB | −20 dB |
|   | Absorbance | 70.0% | 62.6% | | |
| 2 | Reflectance | 6.0% | 18.0% | 54 dB | −29 dB |
|   | Absorbance | 63.0% | 63.0% | | |
| 3 | Reflectance | 12.4% | 22.1% | 52 dB | −34 dB |
|   | Absorbance | 52.9% | 57.9% | | |
| 4 | Reflectance | 0.4% | 16.8% | 56 dB | −20 dB |
|   | Absorbance | 73.5% | 69.5% | | |
| 5 | Reflectance | 3.5% | 19.0% | 55 dB | −28 dB |
|   | Absorbence | 59.5% | 59.5% | | |
|   | Reflectance | 2.9% | 14.1% | 54 dB | −32 dB |
|   | Absorbance | 60.1% | 64.2% | | |

We claim:

1. A method of making an optional information recording medium comprising:
   (a) laminating successively, on a substrate, a first dielectric layer, a phase change type recording layer capable of changing reversibly between an amorphous state and a crystalline state formed reversibly in response to laser beam irradiation conditions, a second dielectric layer, a light reflecting layer and a protection layer; and
   (b) selecting respective thicknesses of said first dielectric layer, said recording layer, said second dielectric layer, said light reflecting layer and said protection layer, in accordance with calculations, to provide a first calculated ratio of light absorption quantity in the recording layer to light irradiation quantity on the recording medium said recording layer is in said crystalline state and a second calculated ratio of light absorption quantity in the recording layer to light irradiation quantity on the recording medium when said recording layer is in said amorphous state, said first ratio being greater than or equal to said second ratio, said first ratio and said second ratio being calculated by a matrix method employing optical constants of constitutional materials of said respective layers.

2. The method according to claim 1, wherein said recording layer has a thickness less than 40 nm.

3. The method according to claim 1, wherein said recording layer consists of a Ge—Sb—Te alloy.

4. A method for recording/reproducing optical information comprising:
   (a) laminating successively, on a substrate, a first dielectric layer, a phase change type recording layer capable of changing reversibly between an amorphous state and a crystalline state formed reversibly in response to laser beam irradiation conditions, a second dielectric layer, a light reflecting layer and a protection layer; and
   (b) selecting respective thicknesses of said first dielectric layer, said recording layer, said second dielectric layer, said light reflecting layer and said protection layer, in accordance with calculations, to provide a first calculated ratio of light absorption quantity in the recording layer to light irradiation quantity on the recording medium when said recording layer is in said crystalline state and a second calculated ratio of light absorption quantity in the recording layer to light irradiation quantity on the recording medium when said recording layer is in said amorphous state, said first ratio being grater than or equal to said second ratio, said first ratio and said second ratio being calculated by a matrix method employing optical constants of constitutional materials of said respective layers;
   (c) irradiating a single laser beam onto said optical information recording medium in a power-modulated mode responsive to information signals; and
   (d) detecting the recorded and unrecorded state of portions of said optical recording information medium by detecting reflectivity differences between recorded and unrecorded portions of said optical recording medium.

5. The method according to claim 4, wherein said recording layer has a thickness less than 40 nm.

6. The method according to claim 4, wherein said recording layer consists of a Ge—Sb—Te alloy.

* * * * *